United States Patent [19]

Kinoshita

[11] Patent Number: 5,602,966
[45] Date of Patent: Feb. 11, 1997

[54] MODELING DEVICE AND MODELING METHOD FOR DETERMINING MEMBERSHIP FUNCTIONS FOR FUZZY LOGIC PROCESSING

[75] Inventor: Naoki Kinoshita, Aichi, Japan

[73] Assignee: Mitsubishi Denki Kabushiki Kaisha, Tokyo, Japan

[21] Appl. No.: 312,721

[22] Filed: Sep. 27, 1994

Related U.S. Application Data

[62] Division of Ser. No. 917,379, Jul. 23, 1992, Pat. No. 5,479,580.

[30] Foreign Application Priority Data

Jul. 25, 1991 [JP] Japan .................................. 3-186338

[51] Int. Cl.$^6$ ...................................... G06F 17/00
[52] U.S. Cl. .................. 395/51; 395/3; 395/76; 395/61
[58] Field of Search .................. 395/3, 51, 900, 395/61, 76

[56] References Cited

U.S. PATENT DOCUMENTS

| | | | |
|---|---|---|---|
| 4,777,585 | 10/1988 | Kokawa et al. | 364/164 |
| 4,777,985 | 10/1988 | Kokawa et al. | 364/164 |
| 4,864,490 | 9/1989 | Nomoto et al. | 395/3 |
| 4,864,990 | 9/1989 | Nomoto et al. | 395/3 |
| 5,193,144 | 3/1993 | Tsutsumi et al. | 395/76 |
| 5,245,698 | 9/1993 | Matsunaga | 395/61 |

FOREIGN PATENT DOCUMENTS

| | | | |
|---|---|---|---|
| 0373628 | 6/1990 | European Pat. Off. | G06F 7/60 |
| 0380785 | 8/1990 | European Pat. Off. | G06J 1/00 |

OTHER PUBLICATIONS

Mitsubishi Electric Advance, "A Neural–Network Type Fuzzy Model", by Atsushi Morita, vol. 51, Jun. 1990, pp. 12–14.

Proceedings of the Second International Conference on Industrial and Engineering Application of Artificial Intelligence and Expert Sytem, "Application of a Self Tuner Using Fuzzy Logic Techniques", by C. Batur et al., vol. 1, Jun. 1989, pp. 235–244.

Patent Abstracts of Japan, vol. 14, No. 503, (P–1126), Nov. 1990 & JP–A–02 207 302 (Omron) Aug. 1990.

Computer Design, "Fuzzy Logic Simplifies Complex Control Problems", by T. Williams, published Mar. 1, 1991, pp. 90–102.

Wayne D. Dettloff et al., "A Fuzzy Logic Controller with Reconfigurable, Cascadable Architecture"; Dec. 31, 1989; pp. 474–478.

Walter H. Bare et al., "Design of a self–tuning Rule based controller for a gasoline refinery catalytic for a gasoline refinery catalytic reformer"; Feb. 1990; vol. 35, pp. 156–164.

Fuzzy Logic L. A. Zadeh Apr. 1988–IEEE.

Self Organizing Model Based Expert controller Batur IEEE Aug. 1989.

Design of Self Tuning Rule Based Controller for a Gasoline Refinery Calalytic Reformer Bare IEEE/Feb. 1990.

A Fuzzy Logic Controller with Reconfigurable, Cascadable Architecture. Dettlof et al. IEEE Oct. '89.

Primary Examiner—Allen R. MacDonald
Assistant Examiner—Richmond Dorvil
Attorney, Agent, or Firm—Sughrue, Mion, Zinn, Macpeak & Seas

[57] ABSTRACT

A fuzzy membership function modeling device in which membership functions, represented as geometric shapes or forms, and inference rules, represented in an If . . . Then format, are stored for access by a processor for making fuzzy inference of a control value for a controlled object. Also stored are parameters that are required to shift the membership functions or change their shapes and target inference values. In operation, corresponding membership functions and inference rules are fetched and an inference result generated. A comparison is made between the stored target value and the inference result value and a difference determined. If the difference is outside a predetermined or selected range, on the basis of stored parameters, the membership function is shifted or the shape thereof is changed by an incremental amount and the inference process is again executed.

16 Claims, 9 Drawing Sheets

SHIFT PARAMETER SETTING MENU

SHIFT INCREMENTS:   A11: h
                                A12: h
                                B2 : 2h

SINGLE-MEMBERSHIP FUNCTION SHIFT: RULE NUMBER M F

MULTIPLE-MEMBERSHIP FUNCTION LOOP SHIFT: SEQUENCE OF
                                                 MEMBERSHIP FUNCTION TO BE LOOPED

R1: A11
                                          R4: A12
                                          R2: B2

LANGUAGE VARIABLE NAME : PRESSURE

MEMBERSHIP FUNCTION NAME : BIG

SHIFT DIRECTION:     A11: R
                             A12: L
                             B2 : R

MODELING DEVICE AND MODELING METHOD FOR DETERMINING MEMBERSHIP FUNCTIONS FOR FUZZY LOGIC PROCESSING

This is a divisional of application Ser. No. 07/917,379 filed Jul. 23, 1992, U.S. Pat. No. 5,479,580.

BACKGROUND OF THE INVENTION

1. Field of the Invention

The present invention relates to the modeling of membership functions for obtaining an optimum inference value through automatic adjustment of the membership functions in a system for controlling a controlled object using a fuzzy inference method. In the modeling process, the characteristics of the controlled object are represented by one or more inference rules and membership functions.

2. Description of the Background Art

Fuzzy logic or fuzzy inference theory has been applied as an alternative to traditional expert systems that employ precise or "crisp" Boolean logic-based rules to the solution of problems involving judgment or control. Where the problems are complex and cannot be readily solved in accordance with the rigid principles of bilevel logic, the flexibility of fuzzy logic offers significant advantages in processing time and accuracy.

The theory of fuzzy logic has been published widely and is conveniently summarized in "Fuzzy Logic Simplifies Complex Control Problems" by Tom Williams, *Computer Design* magazine, pp 90–102 (March 1991).

In brief, however, the application of the theory requires the establishment of a set of rules conventionally referred to as "control rules", "inference rules" or "production rules" that represent the experience and know-how of an expert in the particular field in which a problem to be solved exists. The inference rules are represented in the form of IF . . . (a conditional part or antecedent part) . . . THEN . . . (a conclusion part or consequent part). This is conventionally referred to as an "If . . . Then" format. A large number of rules typically are assembled in an application rule base to adequately represent the variations that may be encountered by the application.

In addition, "membership functions" are defined for the "conditional parts" and the "conclusion parts". Specifically, variables in each of the parts are defined as fuzzy values or "labels" comprising relative word descriptions (typically adjectives), rather than precise numerical values. The set of values may comprise several different "levels" within a range that extends, for example, from "high" to "medium" to "low" in the case of a height variable. Each level will rely on a precise mapping of numerical input values to degrees of membership and will contain varying degrees of membership. For example, a collection of different levels of height from "high" to "low" may be assigned numerical values between 0 and 1. The collection of different levels is called a "fuzzy set" and the function of corresponding different height levels to numerical values is reflected by the "membership" function. Conveniently, the set may be represented by a geometric form, such as a triangle, bell, trapezoid and the like.

Then, in the fuzzy inference control procedure, the inference control is carried out in several steps. First, a determination is made of the conformity with each of the input "labels" in the "conditional part" according to the inference rules. Second, a determination is made of conformity with the entire "conditional part" according to the inference rules. Third, the membership functions of the control variables in the "conclusion part" are corrected on the basis of the conformity with the entire "condition part" according to the inference rules. Finally, a control variable is determined on an overall basis, i.e., made crisp, from the membership functions of the control variables obtained according to the inference rules. The method of determining the control variable, i.e., obtaining a crisp value, is based on any of several processes, including the center of gravity process, the area process and the maximum height process.

The fuzzy inference rules and membership functions represent the knowledge of experts who are familiar with the characteristics of a complicated controlled object including non-linear elements, e.g. the temperature control of a plastic molding machine and the compounding control of chemicals, which are difficult to describe using mathematical models in a control theory. The fuzzy logic system employs a computer to perform the inference rule and membership function processing and thereby achieve expert-level inference.

FIG. 7 shows the configuration diagram of a conventional fuzzy logic device, wherein numeral 1 indicates data input means for fetching information from a system to be controlled, 2 indicates fuzzy inference operation means for making fuzzy inferences based on the input data to the data input means, 3 indicates a data output means for outputting the inference result of the fuzzy inference operation means 2, 4 indicates an inference rule storage means for storing inference rules employed in the fuzzy inference operation means 2, and 5 is a membership function storage means for storing the shape data of the membership functions.

In the conventional fuzzy inference device constructed as described above, the relationships between input data x1, x2, . . . xn from the data input means 1 and output data y output from the data output means 3 are described by inference rules in the "If . . . Then" format. For example, when the input variables are x1 and x2, a plurality of inference rules, such as the following, are stored beforehand in the inference rule storage means 4:

R1: if (x1 is A11) and (x2 is A12) then (y is B1)

R2: if (x1 is A21) and (x2 is A22) then (y is B2)

A11 to A22, B1 and B2 are labels representing the membership functions of the inputs and outputs employed to describe the inference rules Assuming that real values $x1^0$ and $x2^0$ are entered into the data input means 1, inference is made in the fuzzy inference operation means 2 as shown in FIG. 8.

First, the fuzzy inference operation means 2 reads inference rules needed for the inference from the inference rule storage means 4 and relevant membership functions from the membership function storage means 5. Fuzzy inference operation means 2 then calculates the conformities W1, W2 of the condition part with each inference rule as shown in FIG. 8. This calculation may be indicated by the following mathematical expressions (1) and (2):

$$W1 = A11(x1^0) \wedge a12(x2^0) \tag{1}$$

$$W2 = A21(x1^0) \wedge A22(x2^0) \tag{2}$$

where $\wedge$ indicates a minimum (AND) operation i.e. selection of the smallest value.

The fuzzy inference operation means 2 then finds the output values B1' and B2' of each inference rule according to the following mathematical expressions (3), (4):

$$B1'=W1 \wedge B1 \quad (3)$$

$$B2'=W2 \wedge B2 \quad (4)$$

and obtains an inference result B0 according to the following expression:

$$B0=B1' \vee B2'$$

where $\vee$ indicates a maximum (OR) operation, i.e., selection of the largest value.

In practice, this inference result B0 has an inference result value comprising a weighted average (center of gravity) y0. This value is calculated by means of the weight B(y) of an element y in a trapezoid set.

If the inference result value y0, found according to the above process, is undesirable to stabilize the object system, the membership functions such as A11 to A22 or B1, B2 may be slightly shifted. Then, calculations will be made according to the mathematical expressions (1) to (4), whereby an inference result value y0' slightly different from y0 can be found.

For example, the membership function A21 in FIG. 8 can be defined as:

$$A21=(a, 0/b, 1/c, 0)$$

employing the X coordinates a, c and y coordinate 0 of the base and the X coordinate b and Y coordinate 1 of the vertex. To shift this membership function by an amount k, set:

$$A21'=(a-k, 0/b-k, 1/c-k, 0)$$

This new function is not shown in FIG. 8 but would be understood by one of ordinary skill in the art.

Conventionally, a correction of the membership functions provides the inference result value which ensures stable control of the system. However, in the known modeling method, it takes time during a modeling operation to consider how to change which membership functions and to make a compilation for converting the redescribed inference rules and membership functions into a knowledge base that the fuzzy inference operation means can understand. Such modeling operation is illustrated in FIG. 9. There, in steps 2-1 and 2-2, the user describes inference rules for fuzzy control using a membership function editor and an inference rule editor. The membership functions and inference rules described by the membership function description means and inference rule description means are transmitted to the fuzzy inference operation means employing an inference rule compiler, in step 2-3. Considerable time is thus consumed for reinference, e.g. time to make a conversion into the knowledge base in step 2-4, time for the fuzzy inference operation means to read the knowledge base according to step 2-5, and time to store the knowledge base into the internal memory. Further, if the inference result found is rather good but subtly different from an expected inference value, it is very difficult to Judge how to adjust which membership functions and the judgement must therefore depend on trial and error.

SUMMARY OF THE INVENTION

It is, accordingly, an object of the present invention to overcome the disadvantages in the conventional system by providing a device and method for automatically modeling appropriate membership functions for the purpose of control without needing to consider how to correct the proper membership functions in order to provide an expected inference result.

It is a further object of the present invention to provide a device and method for membership function modeling which permits automatic alteration of the membership function.

It is another object of the present invention to permit automatic incremental alteration of the membership function, either by shifting the function or changing its shape.

It is yet another object of the present invention to provide a device and method for membership function modeling which permits automatic alteration of the membership function, subject to limits on the amount and extent of the alteration, as count, maximum and minimum values.

DESCRIPTION OF THE PREFERRED EMBODIMENTS

Figure 1:
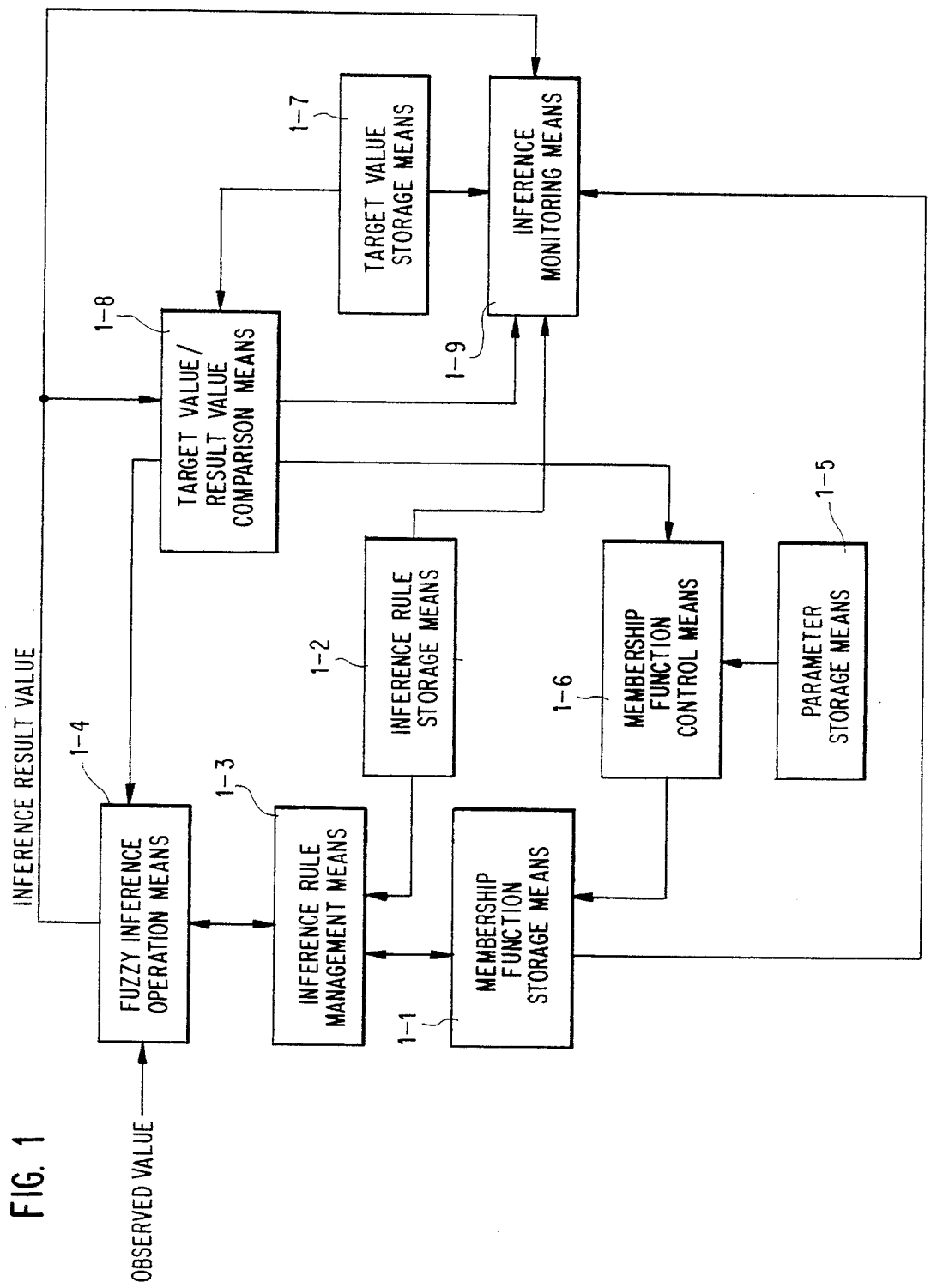
FIG. 1 is a block diagram showing an embodiment of a membership function modeling device according to the present invention.

FIG. 1 shows the configuration diagram of a fuzzy membership function modeling device as an embodiment of the present invention. A membership function storage means 1-1 is used for storing membership functions corresponding to the "condition parts" of the applicable inference rules. An inference rule storage means 1-2 is used for storing fuzzy inference rules in an If . . . Then format. An inference rule management means 1-3 is operative to fetch corresponding membership functions and inference rules from the membership function storage means 1-1 and inference rule storage means 1-2. A fuzzy inference operation means 1-4 is for finding the conformities of modeling input data with the "condition part" of the inference rule using the membership function. A parameter storage means 1-5 is for storing various parameters for shifting the membership function or changing the shape (inclination) thereof. A membership function control means 1-6 is used for receiving the parameters from the parameter storage means 1-5 and shifting the membership functions in the membership function storage means 1-1 or changing the shapes thereof either leftward or rightward. A target value storage means 1-7 is for storing a target inference result value and its permissible range δ. A target value/result value comparison means 1-8 is used for comparing the target value and inference result value.

Finally, an inference monitoring means 1-9 is used to display on a CRT, or the like, the target value and inference result value and a difference therebetween as a trend.

The target inference result value and permissible range δ may be those set on the basis of an expert's experience or those set tentatively by an operator. When the operator has set them tentatively, he only needs to attempt an initial control function. Thereafter, he can change the target inference result value or permissible range δ on the basis of the initial control result.

The operation of shifting membership functions and operating on an inference result will now be described. As in the background example, it is assumed that there are two inputs, one output and a plurality of rules applicable to a processing. In this case, it is assumed that the inference rule storage means 1-2 stores the following n inference rules when there are two input variables x1 and x2:

| | |
|---|---|
| R1: | if (x1 is A11) and (x2 is A12) then (y is B1) |
| R2: | if (x1 is A21) and (x2 is A22) then (y is B2) |
| . | |
| . | |
| . | |
| Rn: | if (x1 is An1) and (x2 is An2) then (y is Bn) |

Figures 3, 7:
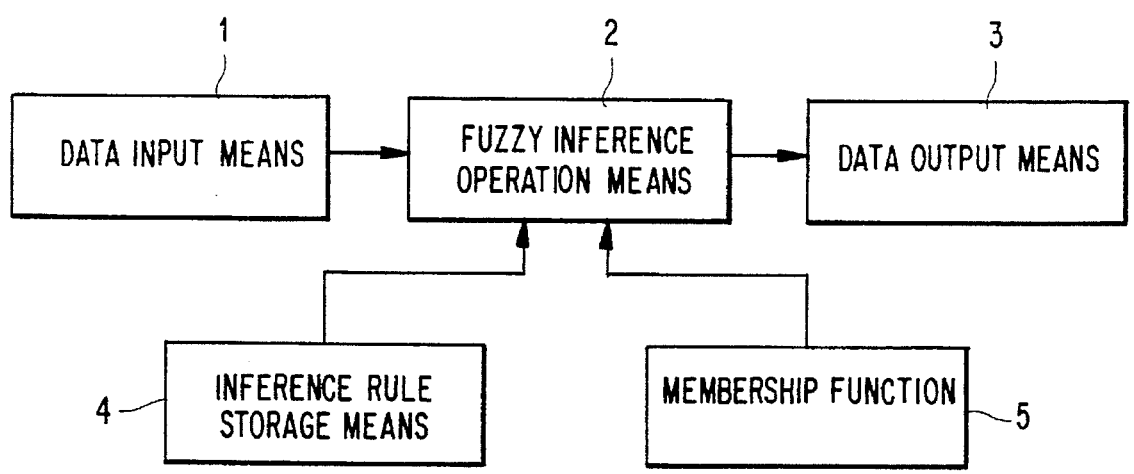
FIG. 3 shows a CRT screen illustrating shift parameter setting according to the present invention.
FIG. 7 is a block diagram showing the configuration of a conventional membership function inference device.

The shapes of the membership functions A11 to An2 and B1 to Bn are kept in the membership function storage means 1-1. In addition, required data is set for various parameters used during the membership function shifting operation. In the preferred embodiment, the setting is by an operator using a display, as seen in FIG. 3. The parameters to be set are shift increments h, and a membership function name for a single-membership function shift. Where plural membership functions are to be shifted, the set parameters include the sequence of inference rules and membership functions looped (shifted in order of 1: A11, R4: A12, R2: B2 in this example), the language variable name ("PRESSURE", in this example) whose membership functions are to be shifted, the label name of the membership functions ("BIG", in this example) and the shift directions of the membership functions, L (leftward) or R (rightward) for a multiple-membership function loop shift. These parameters are stored in the parameter storage means 1-5.

Figure 2:
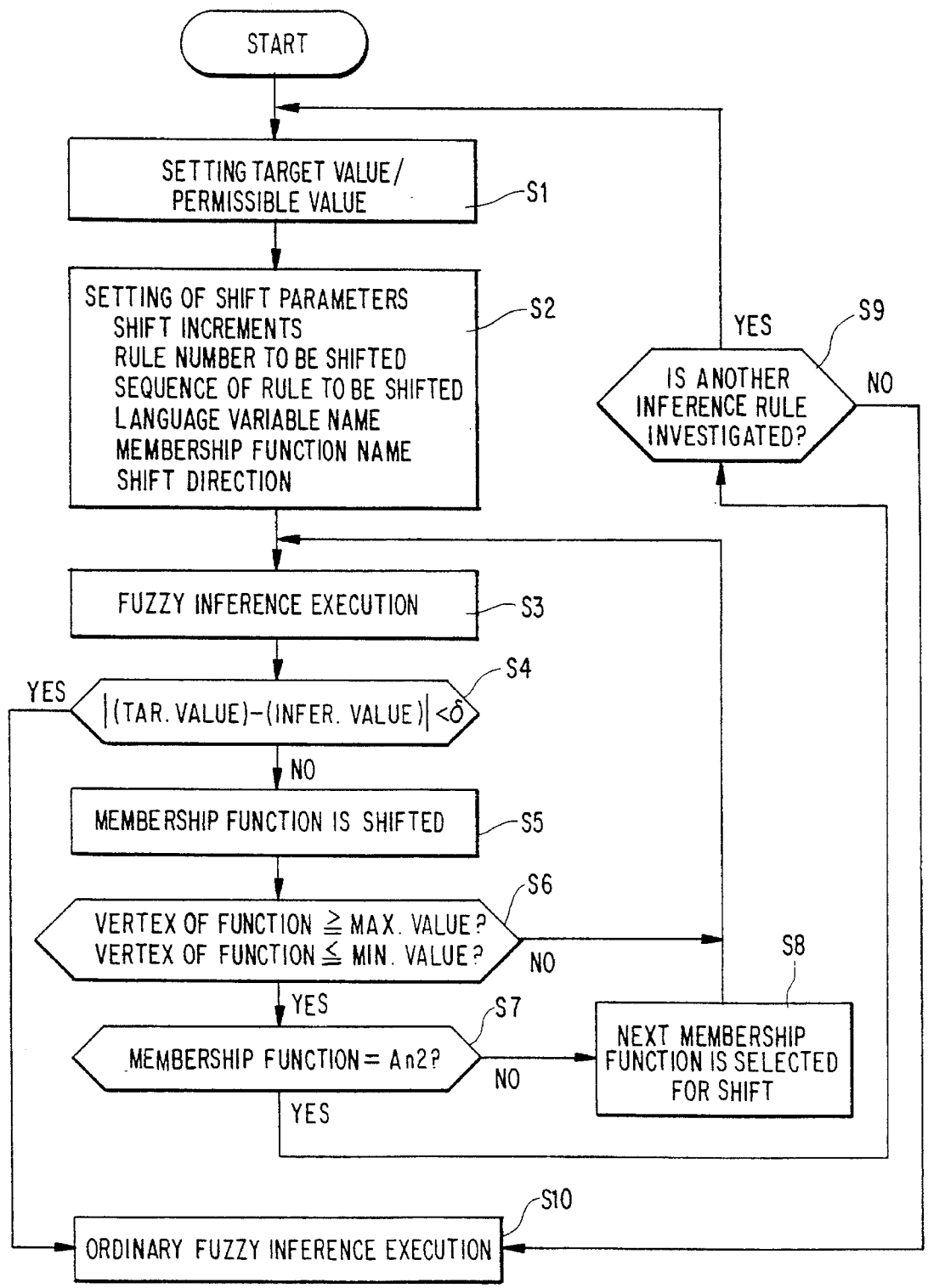
FIG. 2 is a flowchart showing an embodiment of a membership function modeling method according to the present invention.

Through the above setting, inference is made according to a flowchart shown in FIG. 2. Whose operation may be described as follows:

In step S1, a target inference result value and its permissible range are entered into the target value storage means 1-7 as output y.

In step S2, parameters used in relation to a possible shift are set. These parameters are set for use in the event that the inference result value does not satisfy the permissible range of the target inference result value. Specifically, the increments "h" for shifting the membership function, and the inference rule numbers to be shifted, i.e. the membership function name for a single membership function and the inference rules and membership functions to be shifted and a shifting sequence for multiple membership functions, are set by the operator. Also set is a language variable name to be shifted; however, the membership functions of any unspecified language variable name are not shifted. Further set is a membership function name belonging to the specified language variable name and described as an inference rule. Finally, the direction of shifting the membership function, leftward or rightward is set.

In step S3, fuzzy inference, as described in the background art, is executed.

In step S4, the target value/result value comparison means 1-8 determines whether or not the absolute value of a difference between the target value set in the step S1 and the inference result value found in the step S3 falls within the permissible range stored in the target value storage means 1-7.

Figure 4:
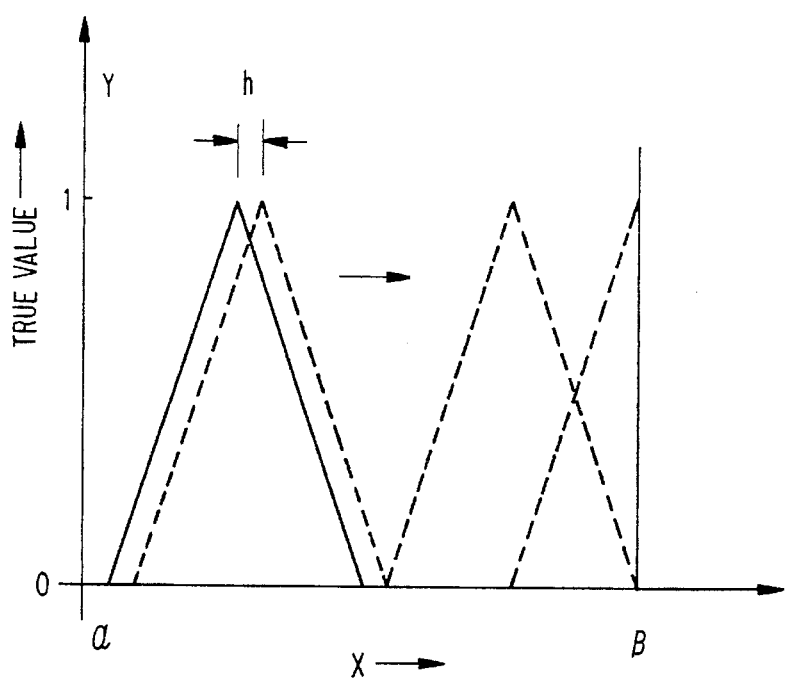
FIG. 4 illustrates a shift status of a membership function.

In step S5, if the difference between the target value and inference result value is still outside the permissible range in the step S4, the membership function control means 1-6 causes the membership function to be shifted (parallel movement) in the set direction by the increments h as shown in FIG. 4. The result is stored into the membership function storage means 1-1.

In step S6, as shown in FIG. 4, it is determined whether or not the X coordinate of a vertex of the membership function has matched the shiftable maximum value β or minimum value α of that membership function (such maximum and minimum values are set simultaneously with the definition of the membership function) as a result of the shift in the step S5. The maximum and minimum values may be replaced by the number of shifts which can be obtained from the shiftable maximum value β or minimum value α and increments h.

In step S7, if it has been determined that the X coordinate of the vertex has already reached either of the maximum or minimum value as a result of the judgment in the step S6, it is determined whether the membership function name currently to be shifted is the last-set membership function An2 or not. If it is already An2, the shift operation is stopped and step S9 urges the investigation of another inference rule. If another inference rule is to be investigated, the processing returns to the step S1. If no further investigation is to be made, ordinary fuzzy inference is to be executed (step S10).

In step S8, if the last membership function An2 set in the step S2 is not the membership function name currently to be shifted, the next membership function name is selected for the shift and the processing returns to the step S3.

Namely, in the step S3 in this stage, fuzzy inference is executed again using the first membership function name having been shifted leftward or rightward by the increments h or the next-defined membership function.

Figure 5A:
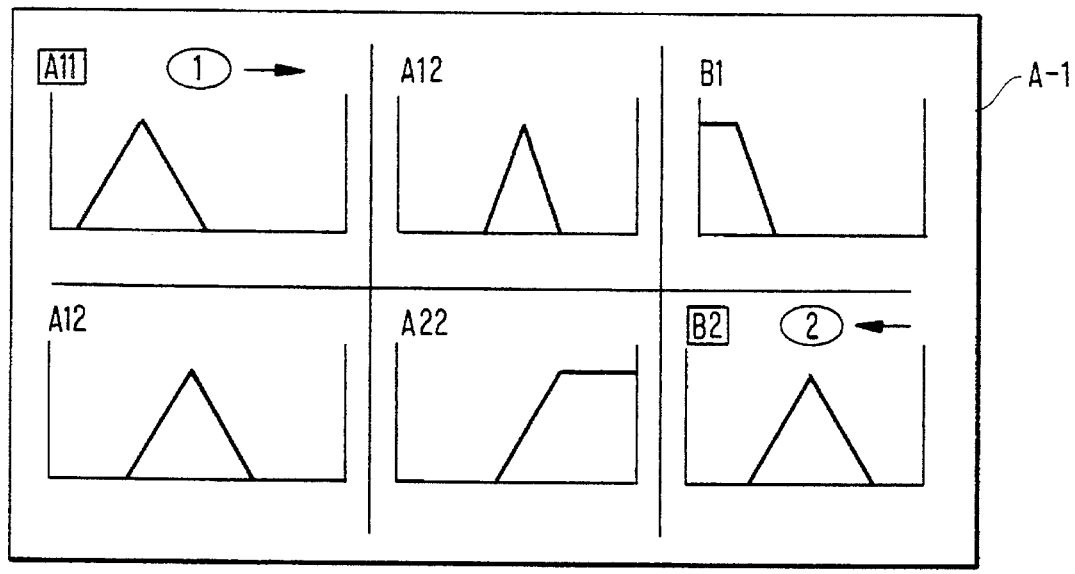
FIGS. 5A–5F illustrate how an inference result value changes by shifting the membership functions.
Figure 5B:
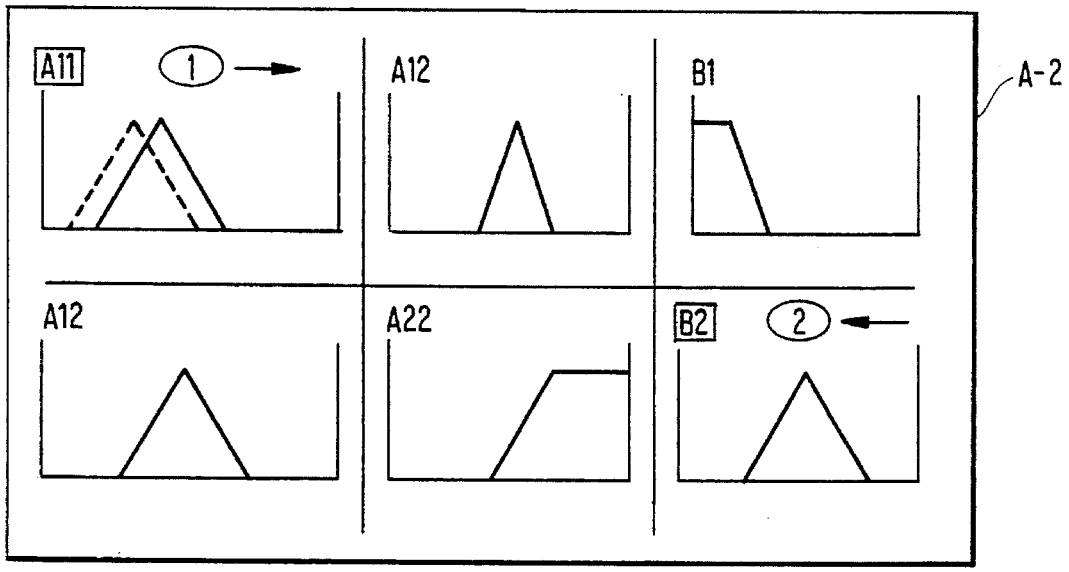

An example can be considered where the plurality of rules is limited to two and only two membership functions are to be shifted, i.e., A11 of input language variable X1 and B2 of output language variable Y. The shift sequence in this case is assumed to be A11 first and then B2. The shift direction is rightward for A11 and is leftward for B2. The direction of movement is illustrated in FIG. 5A and the sequence, as it affects the state in FIG. 5A as described below, is illustrated in FIGS. 5B–5F.

Figure 8:
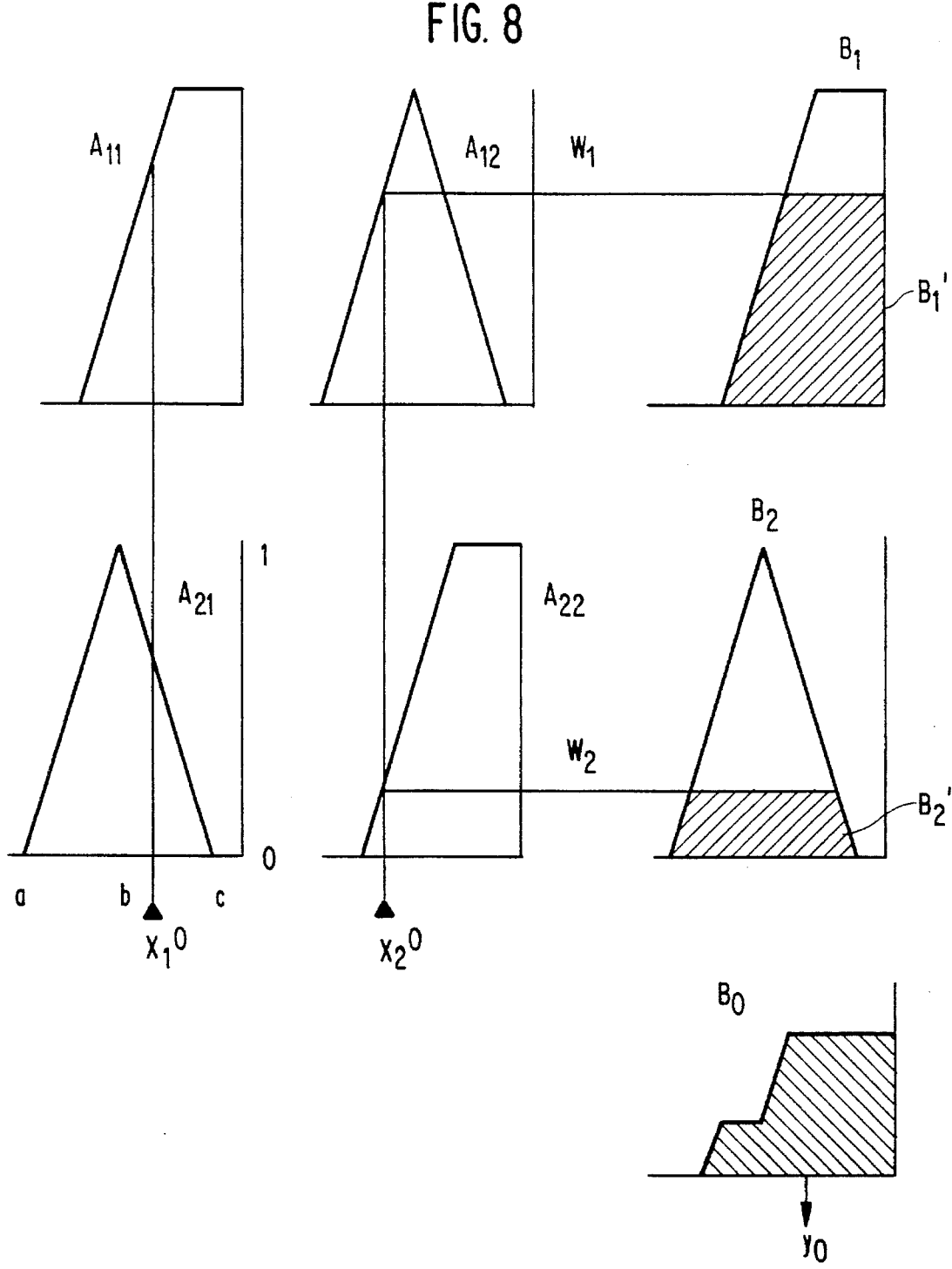
FIG. 8 illustrates how the inference result is operated on from the membership functions.
Figure 9:
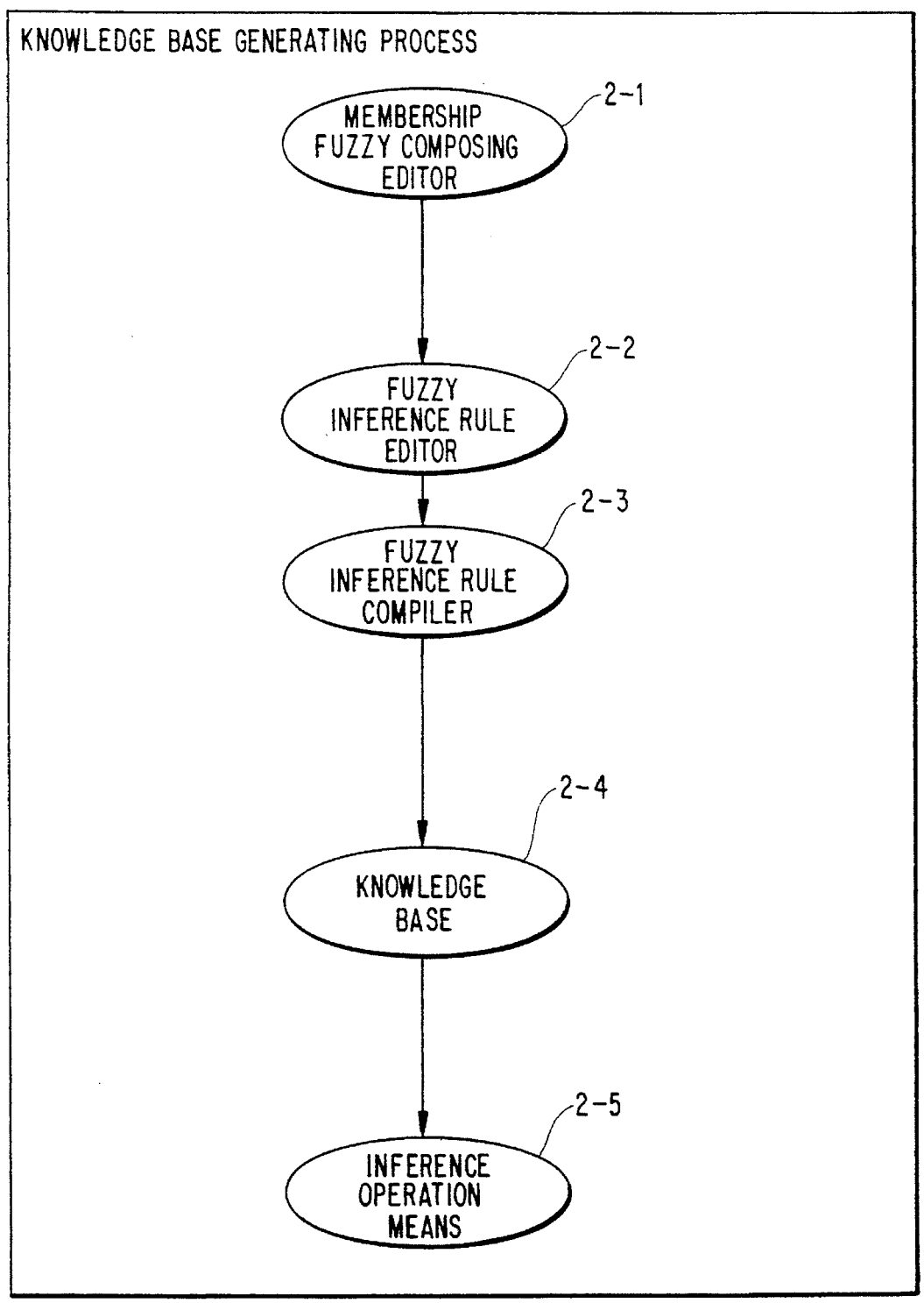
FIG. 9 illustrates the manner in which a knowledge base is constructed in the conventional art in order to permit appropriate shifts in the membership functions.

On the basis of this example, the flowchart of FIG. 2 is followed and the steps S1 and S2 are completed by setting the appropriate input values, ranges and parameters. Thereafter, an initial fuzzy inference operation is conducted in accordance with step S3. For purposes of this example, it is assumed that the result of the initial operation is as seen in FIG. 8 and the difference between the target inference result value set in step S1 and the inference result value found in step S3 is greater that the permissible range.

On the basis of this determination, the remaining steps of FIG. 2 are followed and the results are illustrated in FIGS. 5B–5F:

1) A11 is first shifted rightward by an increment h, as specified in step S2, with B2 fixed, as seen in FIG. 5-B.
2) Fuzzy inference is made, as in step S3.

3) An inference result value found is compared with a target value. If a difference therebetween does not fall within the permissible error range δ, A11 is further shifted rightward by h, as specified in steps S4 and S5, and as illustrated in FIG. 5C.

Figure 5C:
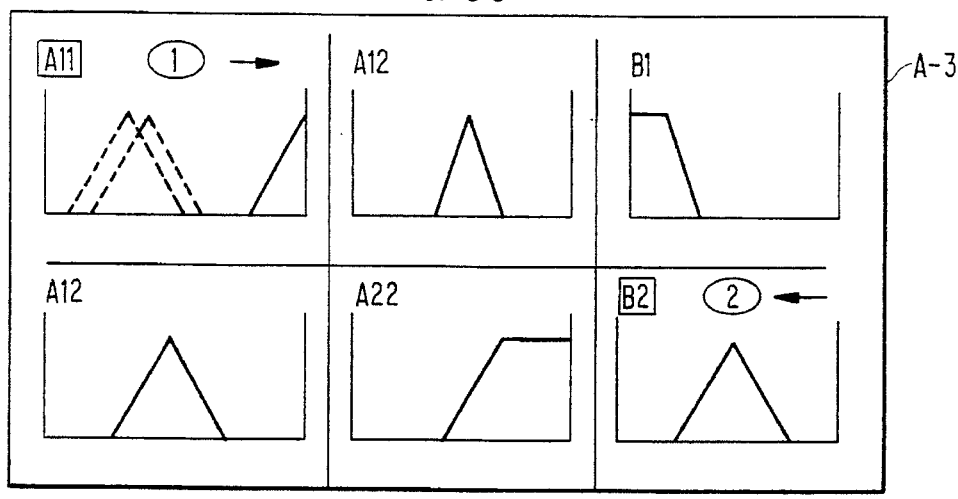
Figure 5D:
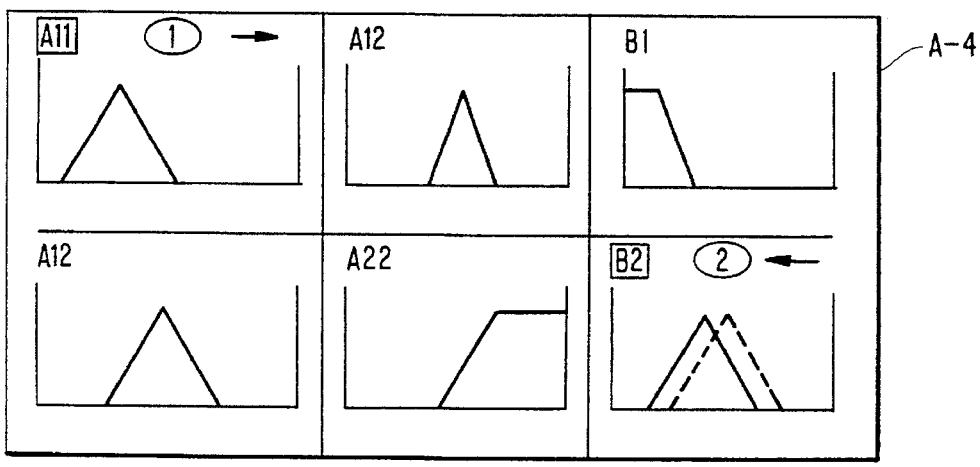
Figure 5E:
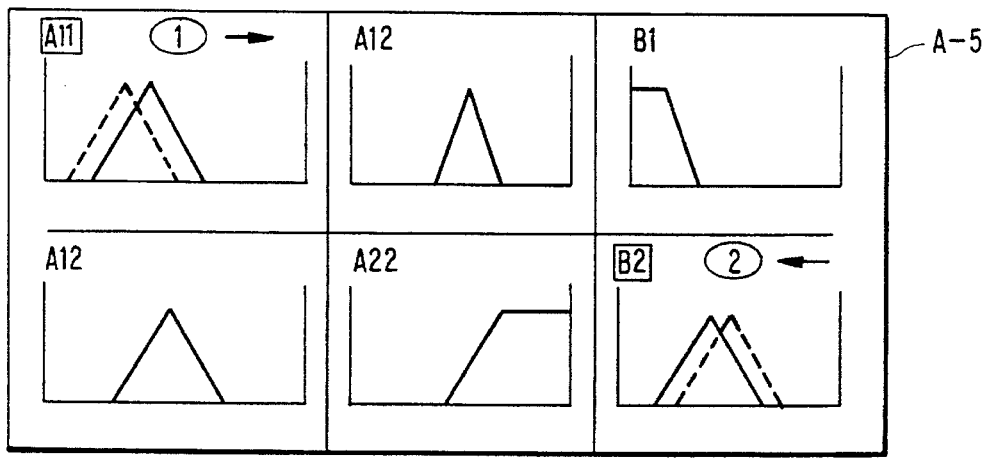

4) This operation is performed until the vertex of the triangle of A11 reaches the maximum definition area β, as specified in step S6 and illustrated in FIG. 5C. If A11 has reached β but the difference between the inference result value and target value is still outside the permissible error range δ, B2 is shifted leftward by h and the operations in (1) to (4) are repeated, as illustrated in FIGS. 5D and 5E.

5) If the difference between the inference result value and target value is still outside δ after the series of loop shift operations, the membership function of another rule may be loop-shifted.

Figure 5F:
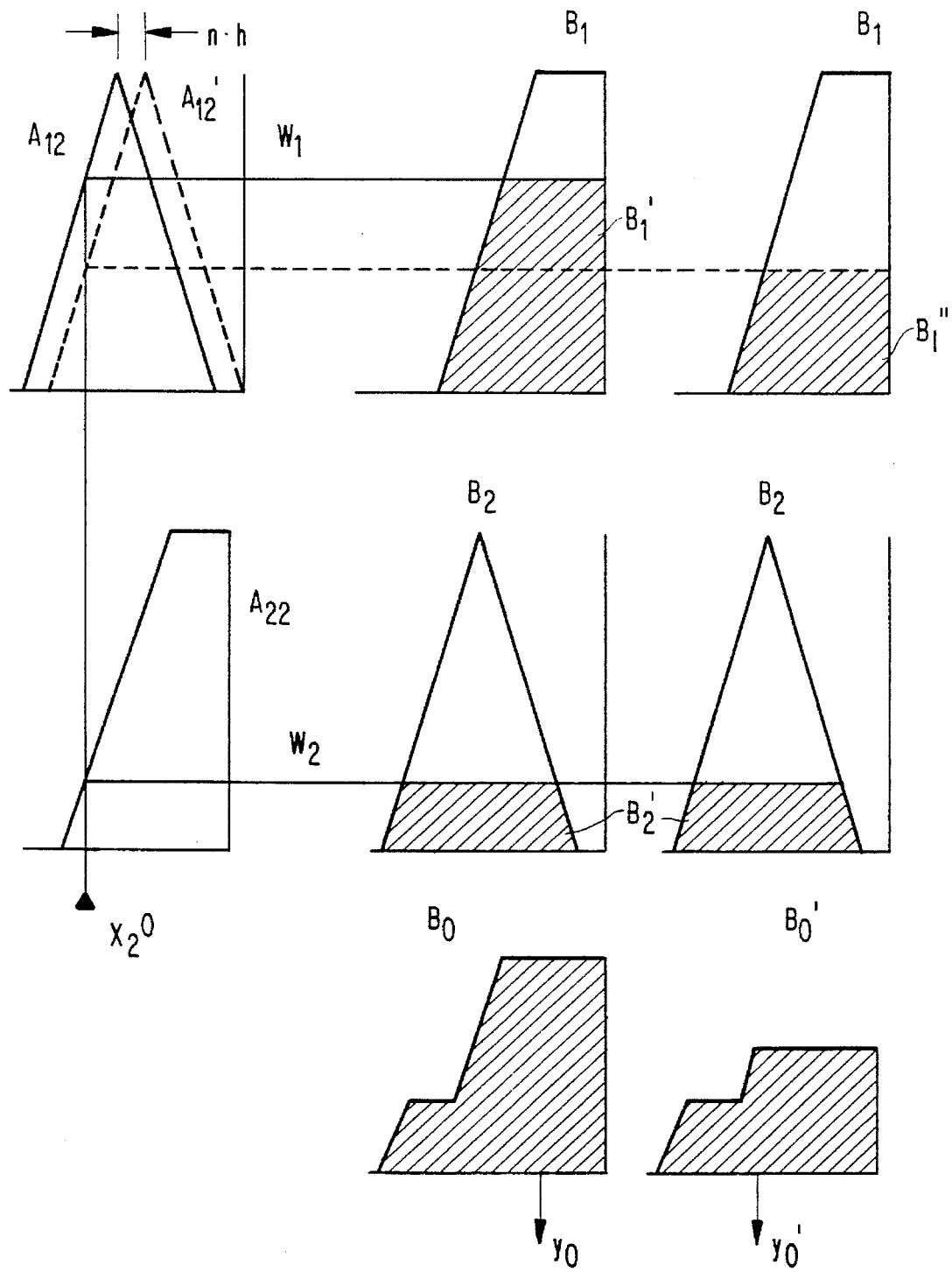

FIG. 5F shows the status of inference result values y0 and y0' operated on with the first membership function and the first membership function shifted by the increments h, respectively. The output membership functions for the first rule membership functions A12 and A12' is seen as a shift in value from B1' to B1", and the output membership functions for the second rule membership function remains at B2'. The effect of the shift in the first membership function on the result is seen in the difference of position between y0 and y0'.

The above operation causes fuzzy inference to be executed for all the language variable names and membership functions stored in the membership function storage means 1-1. When the difference between the target value and inference value falls within the permissible range δ as a result of the judgment in the step S4, the membership functions are not shifted any more and ordinary fuzzy inference is executed in the step S10. In the step S10, the expected inference result value of a certain output language variable set in the step S1 has been satisfied within the permissible range δ.

In describing the second embodiment of the invention, it should be appreciated that the membership functions which are altered by shifting, as described in the first embodiment, may be changed in shape (inclination) to produce an identical effect.

In order to change the shapes of membership functions, the shifting increments, the membership functions to be shifted, the sequence of altering the membership functions, and the shifting direction set in the step S2 in the flowchart in FIG. 2 are replaced by an inclination value to be changed, membership functions to be changed in shape, a sequence of membership functions to be changed in shape, and inclination changing directions. These different parameters change the shifts made in the steps S5 and S8 into shape changes.

Figure 6:
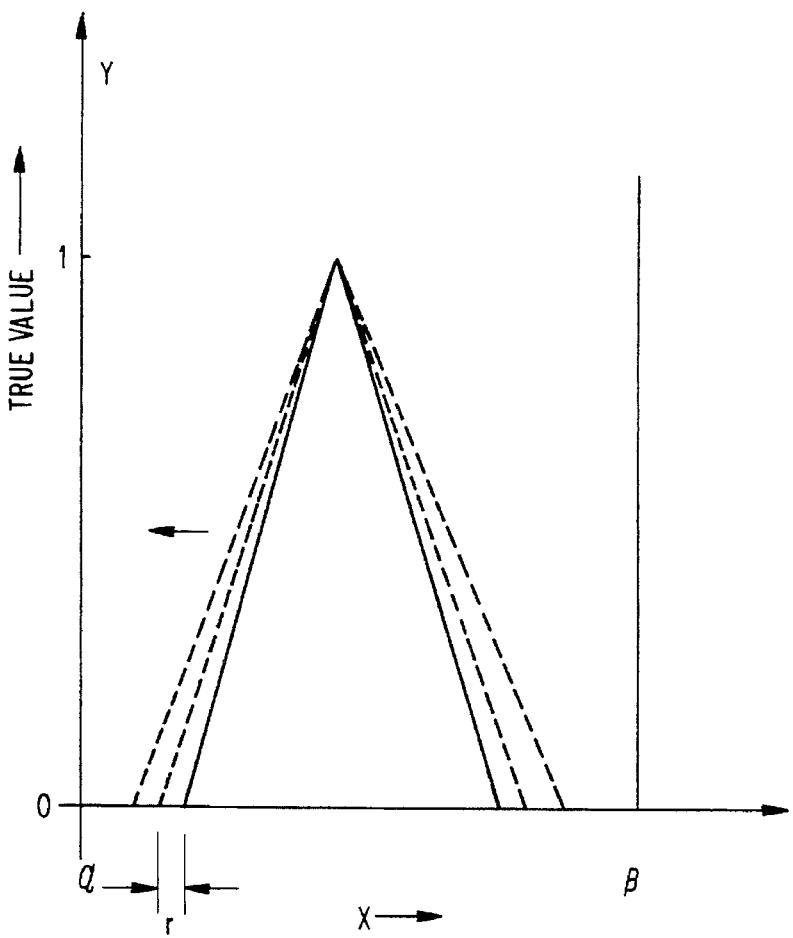
FIG. 6 illustrates how the inclination and position of a membership function is changed.

It will also be appreciated that while the shift operation is stopped when the X coordinate of the vertex of a membership function has reached the maximum or minimum value of the shift in the first embodiment, the membership function shape changing operation may be stopped when the coordinates of both ends of the base of a membership function have reached a preset maximum or minimum value. FIG. 6 shows an example wherein the X coordinate is changed in increments of r.

It will be apparent that the invention, as described above, limits the known complicated, time-consuming modeling of membership functions to inference rules and membership functions specified by the user and shifts the membership functions or change the shapes thereof to automatically change an inference value, whereby complications in the conventional designs have been eliminated and the user is allowed to model the membership functions by merely monitoring the changes in inference value on the CRT.

The entire disclosure of each and every foreign patent application from which the benefit of foreign priority has been claimed in the present application is incorporated herein by reference, as if fully set forth.

Although this invention has been described in at least one preferred form with a certain degree of particularity, it is to be understood that the present disclosure of the preferred embodiment has been made only by way of example and that numerous changes in the details and arrangement of components may be made without departing from the spirit and scope of the invention as hereinafter claimed.

What is claimed is:

1. A fuzzy membership function modeling method in a fuzzy inference method for making fuzzy inference of a control value of a controlled object and operating on an inference result using selected inference rules and membership functions, comprising the steps of:

1) setting a permissible range of a predetermined target inference result and parameters for altering said membership functions by a predetermined amount;

2) making fuzzy inference of a control value using said inference rules and membership functions and determining whether an inference result satisfies said permissible range of said predetermined target inference result;

3) altering said membership functions according to said parameters if the inference result does not satisfy the permissible range of said predetermined target inference result;

4) making fuzzy inference of said control value and operating on the inference result using said altered membership function and said inference rules to obtain a control variable that is used to control the controlled object, wherein said parameters comprise parameters to shift said membership function incrementally.

2. The fuzzy membership modeling method as set forth in claim 1 further comprising:

5) determining whether said inference result satisfies said set permissible range of said predetermined target inference result; and 6) repeating said steps 3), 4) and 5) if said inference result does not satisfy said permissible range of said predetermined target inference result in said step 4).

3. A fuzzy membership modeling method as set forth in claim 1 wherein said parameters comprise parameters to change a shape of said membership function.

4. A fuzzy membership modeling method as set forth in claim 1 wherein said membership function is represented as a curve along an axis and is shifted in increments along said axis.

5. A fuzzy membership function modeling method, as defined in claim 1, wherein at least one of the predetermined target inference result, the inference result value obtained by inferring the control value of a controlled object using the inference rules and membership functions, and a difference between said predetermined target result and said inference result value is displayed as a trend.

6. A fuzzy membership function modeling method in a fuzzy inference method for making fuzzy inference of a control value of a controlled object and operating on an inference result using inference rules and membership functions, comprising the steps of:

1) setting a permissible range of a predetermined target inference result, parameters required to alter said membership functions by a predetermined amount, and an alteration limit for at least one membership function;

2) making fuzzy inference of a control value using at least one of said inference rules and at least one of said membership functions and determining whether the inference result satisfies said permissible range of said predetermined target inference result;

3) altering at least one of said membership functions according to said parameters (i) if said inference result does not satisfy said permissible range of said predetermined target inference result, and (ii) if said altering has reached said alteration limit for said membership function;

4) making fuzzy inference of said control value and operating on the inference result using the altered membership function and inference rule to obtain a control variable that is used to control the controlled object, wherein said parameters comprise parameters to shift said at least one of said membership functions incrementally.

7. The fuzzy membership modeling method as set forth in claim 6 further comprising:

5) determining whether said inference result satisfies said permissible range of said predetermined target inference result;

6) determining whether said alteration has reached said alteration limit; and 7) repeating said steps 3), 4), 5) and 6) if said inference result does not satisfy said permissible range of said predetermined target inference result as determined in step 5) and said alteration limit as determined in step 6).

8. A fuzzy membership modeling method as set forth in claim 6 wherein said alteration limit comprises at least one of a maximum value and a minimum value.

9. A fuzzy membership modeling method as set forth in claim 6 wherein said alteration limit comprises a permissible number of alterations.

10. A fuzzy membership modeling method as set forth in claim 6 wherein said parameters comprise parameters to change a shape of said membership function and said alteration limit comprises at least one of a maximum value and a minimum value.

11. A fuzzy membership modeling method as set forth in claim 6 wherein said parameters comprise parameters to change a shape of said membership function and said alteration limit comprises a permissible number of alterations.

12. A fuzzy membership modeling method as set forth in claim 6 wherein said membership function is represented as a curve along an axis and is shifted in increments along said axis.

13. A fuzzy membership modeling method as set forth in claim 6 wherein said parameters comprise a sequence of the membership functions to be altered.

14. A fuzzy membership function modeling method, as defined in claim 6, wherein at least one of the predetermined target inference result, the inference result value obtained by inferring the control value of a controlled object using the inference rules and membership functions, and a difference between said predetermined target result and said inference result value is displayed as a trend.

15. A fuzzy membership function modeling method in a fuzzy inference method for making fuzzy inference of a control value of a controlled object and operating on an inference result using a plurality of inference rules and membership functions, comprising the steps of:

1) setting a permissible range of a predetermined target inference result, parameters required to incrementally shift the membership functions or incrementally change shapes thereof by a predetermined amount, a maximum value or a minimum value of a shift or shape change or a permissible shift/change value such as a permissible number of shifts or a permissible number of changes for the membership function, and a sequence of the membership functions to be shifted or shape-changed;

2) making fuzzy inference of a control value using the inference rules and set membership functions and determining whether the inference result satisfies the permissible range of the predetermined target inference result;

3) shifting the membership function or changing a shape thereof according to the parameters if the inference result does not satisfy the permissible range of the predetermined target inference result, stopping the shift or shape change if said shift or shape change has reached the permissible shift/change value, reading a next membership function, and executing the steps from said step 2) onward;

4) making fuzzy inference of said control value and operating on the inference result using the shifted or shape-changed membership functions and inference rules to obtain a control variable that is used to control the controlled object, and determining whether said inference result satisfies the permissible range of the predetermined target inference result; and 5) repeating said steps 3) and 4)if the inference result does not satisfy the permissible range of the predetermined target inference result in said step 4).

16. A fuzzy membership function modeling method, as defined in claim 15, wherein at least one of the predetermined target inference result, the inference result value obtained by inferring the control value of a controlled object using the inference rules and membership functions, and a difference between said predetermined target result and said inference result value is displayed as a trend.

* * * * *